(12) United States Patent
Chen et al.

(10) Patent No.: US 9,401,620 B2
(45) Date of Patent: Jul. 26, 2016

(54) CHARGING BATTERY UNIT AND ELECTRONIC DEVICE WITH THE SAME

(71) Applicants: CHAMP TECH OPTICAL (FOSHAN) CORPORATION, Foshan (CN); Foxconn Technology Co., Ltd., New Taipei (TW)

(72) Inventors: Hai-Lin Chen, Foshan (CN); Di-Qiong Zhao, Foshan (CN); Ching-Hsing Huang, New Taipei (TW); Yung-Ping Lin, New Taipei (TW); Chih-Feng Hu, New Taipei (TW)

(73) Assignees: CHAMP TECH OPTICAL (FOSHAN) CORPORATION, Foshan (CN); Foxconn Technology Co., Ltd., New Taipei (TW)

( * ) Notice: Subject to any disclaimer, the term of this patent is extended or adjusted under 35 U.S.C. 154(b) by 284 days.

(21) Appl. No.: 14/080,770

(22) Filed: Nov. 14, 2013

(65) Prior Publication Data

US 2015/0102770 A1    Apr. 16, 2015

(30) Foreign Application Priority Data

Oct. 11, 2013    (CN) .......................... 2013 1 04713747

(51) Int. Cl.
| H02J 7/00 | (2006.01) |
| H02J 7/02 | (2016.01) |
| H02J 17/00 | (2006.01) |

(52) U.S. Cl.
CPC ............... *H02J 7/025* (2013.01); *H02J 7/0042* (2013.01); *H02J 17/00* (2013.01)

(58) Field of Classification Search
CPC ........... H02J 5/005; H02J 7/025; H02J 7/027; H02J 7/0042; B60L 11/182; B60L 11/1816; B60L 11/1829
USPC .................................................. 320/107–108
See application file for complete search history.

(56) References Cited

U.S. PATENT DOCUMENTS

| 2007/0182367 A1* | 8/2007 | Partovi ........................... 320/108 |
| 2010/0013432 A1* | 1/2010 | Toya et al. ..................... 320/108 |
| 2011/0234154 A1* | 9/2011 | Navid ............................. 320/108 |
| 2012/0245403 A1* | 9/2012 | Martinez ........................ 600/13 |
| 2013/0026984 A1* | 1/2013 | Yamamoto et al. ............ 320/108 |
| 2013/0049675 A1* | 2/2013 | Minami ......................... 320/103 |

\* cited by examiner

*Primary Examiner* — Paul Dinh
(74) *Attorney, Agent, or Firm* — ScienBiziP, P.C.

(57) ABSTRACT

A charging battery unit includes a receiving unit and a battery. The receiving unit includes a fixing member and a coil fixed on the fixing member. The coil receives external electromagnetic signals to generate induction currents. The battery is electrically connected to the coil and receives the induction currents generated by the coil. The present disclosure also relates an electronic device with the charging battery unit.

8 Claims, 3 Drawing Sheets

CHARGING BATTERY UNIT AND ELECTRONIC DEVICE WITH THE SAME

BACKGROUND

1. Technical Field

The disclosure relates to a charging battery unit and an electronic device with the same.

2. Description of Related Art

Wireless charging device used in the portable electronic product needs to pass through Wireless Power Consortium (WPC, Qi) authentication. However, the receiving unit of the wireless charging device is incorporated into the back cover of the portable electronic product; therefore, it needs to detect the whole portable electronic product in the WPC authentication, not only the receiving unit, resulting in the detecting process inconvenient.

Therefore, what is needed is a charging battery unit and an electronic device with the same which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present charging battery unit and electronic device for microminiaturization. Moreover, in the drawing, like reference numerals designate corresponding parts throughout the whole view.

DETAILED DESCRIPTION OF EMBODIMENTS

Figure 1:
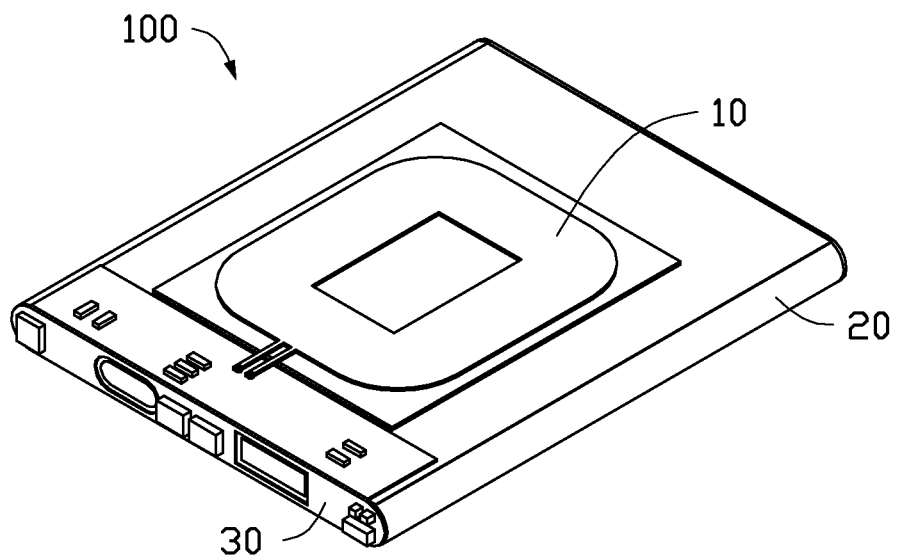
FIG. 1 is a schematic, isometric view of a charging battery unit, in accordance with an embodiment of the present disclosure.
Figure 2:
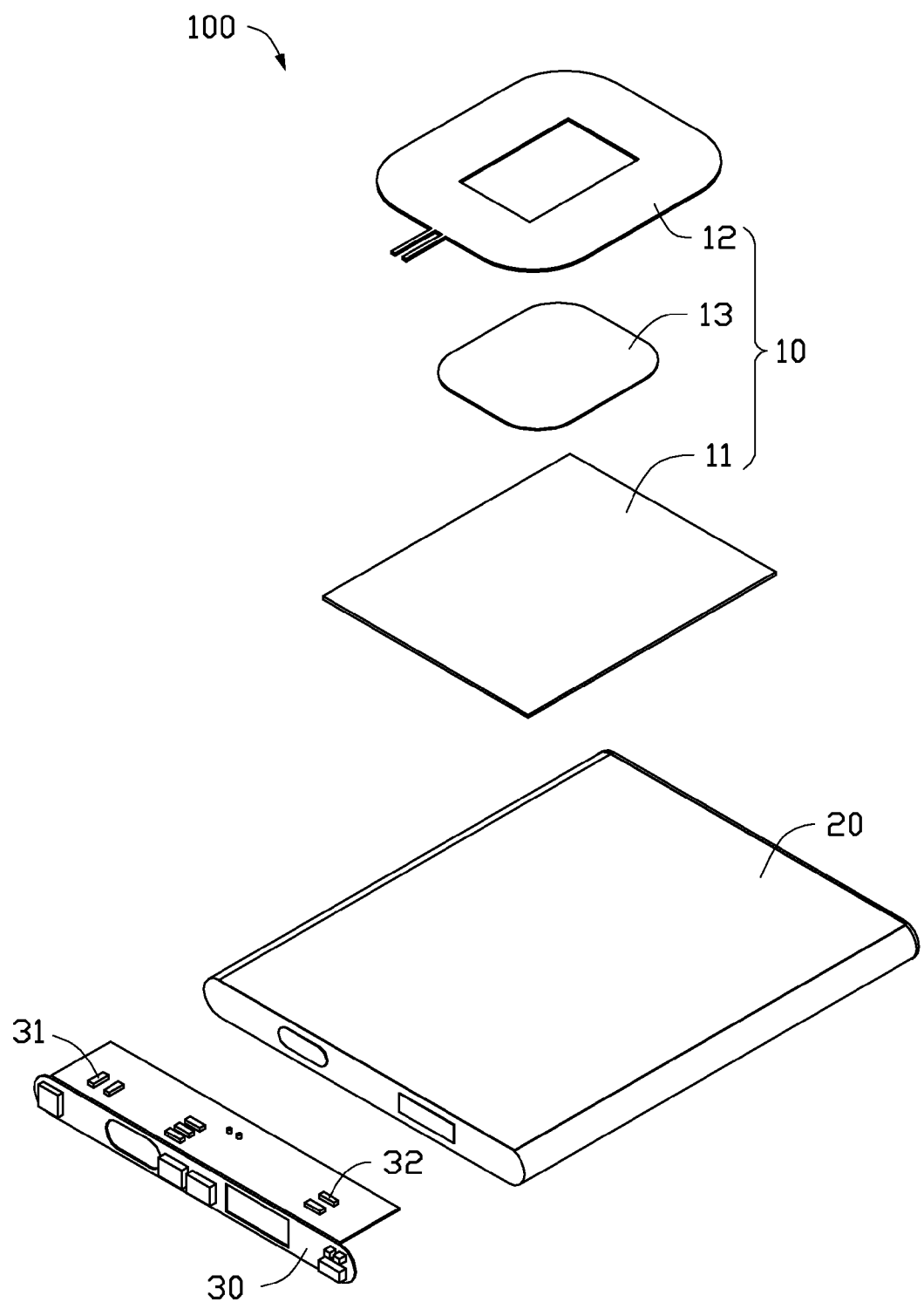
FIG. 2 is a disassembled view of the charging battery unit of FIG. 1.

Referring to FIGS. 1 and 2, a charging battery unit 100 in accordance with an embodiment of the present disclosure is illustrated. The charging battery unit 100 can be charged via wireless or wire; therefore, the charging battery unit 100 is suitable for various applications. The charging battery unit 100 includes a receiving unit 10, a battery 20 and a circuit board 30.

The receiving unit 10 includes a fixing member 11, a coil 12 and a wave-shielding plate 13. In the present embodiment, the fixing member 11 is a paster, and used for fixing the coil 12 on the battery 20. The wave-shielding plate 13 is arranged between the fixing member 11 and the coil 12. The coil 12 receives external electromagnetic signals to generate induction currents. Generally, the external electromagnetic signals are generated by a transmitting unit of a wireless charging device. In an alternative embodiment, the receiving unit 10 can include two or more than coils 12 with different shapes.

The battery 20 is electrically connected to the coil 12 and receives the induction currents generated by the coil 12.

In the present embodiment, the circuit board 30 is an integrated circuit board and electrically connected to the battery 20. The circuit board 30 has a detecting unit 31 and a display unit 32 electrically connected to the detecting unit 31. The detecting unit 31 detects the quantity of electricity of the battery 20, and the display unit 32 displays the quantity of electricity of the battery 20 detected by the detecting unit 31.

In the present embodiment, the display unit 32 includes two LEDs. The LEDs emit light when the battery 20 is fully charged. Furthermore, the circuit board 30 can include a protect circuit.

The charging battery unit 100 can be charged via wireless or wire. When the charging battery unit 100 is charged by wireless, the coil 12 receives the external electromagnetic signals to generate induction currents. The battery 20 is charged via the receiving unit 10. In the process of charging, the detecting unit 31 can detect the quantity of electricity of the battery 20. When the battery 20 is full, the display unit 32 is brighten up. When the charging battery unit 100 is charged by wire, the battery 20 is physically connected to a charger.

Figure 3:
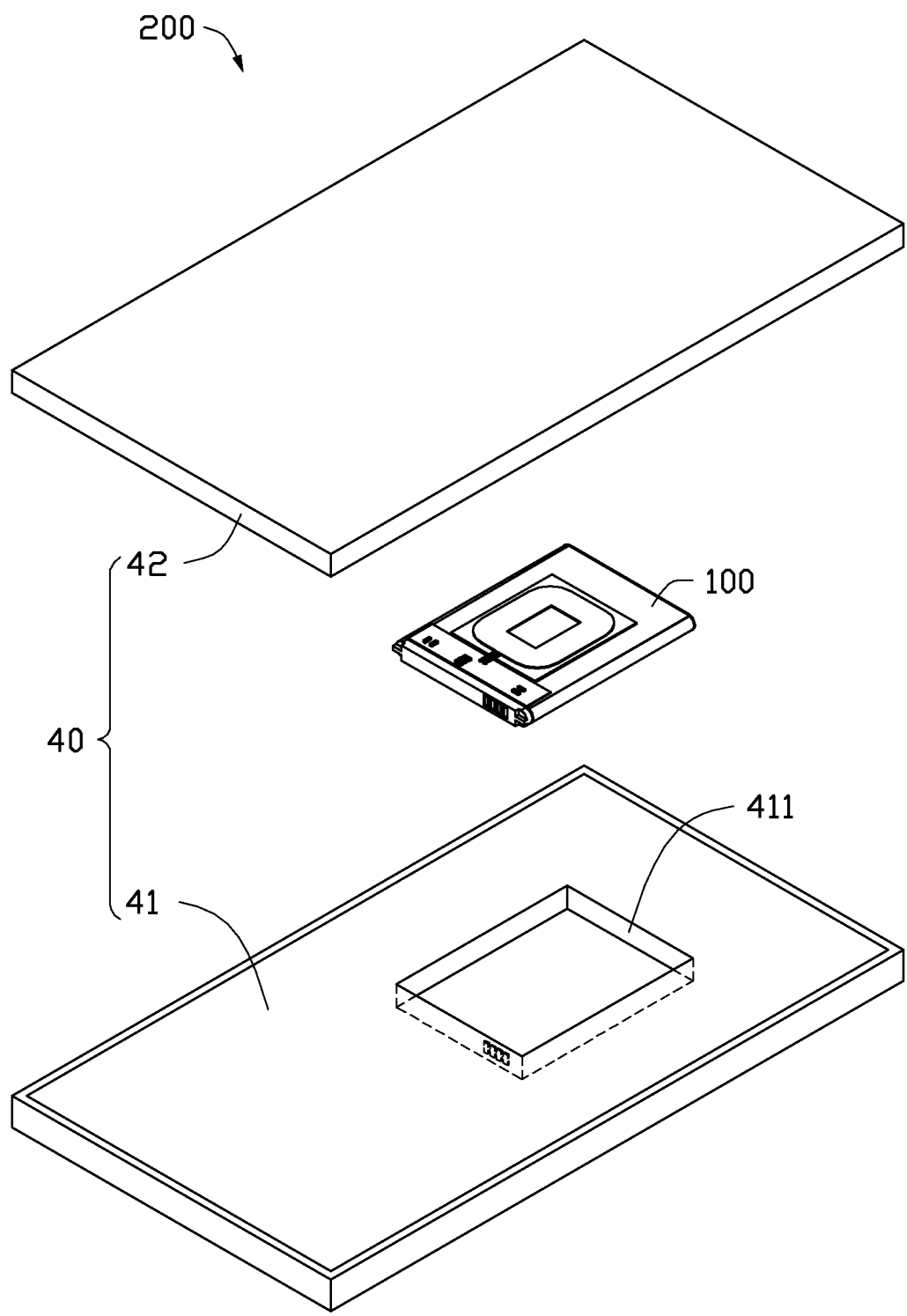
FIG. 3 is a disassembled view of an electronic device with the charging battery unit of FIG. 1.

Referring to FIG. 3, an electronic device 200 with the charging battery unit 100 is illustrated. The electronic device 200 can be camera, mobile telephone, tablet personal computer. In the present embodiment, the electronic device 200 is a mobile telephone. The electronic device 200 includes a main body 40 and the charging battery unit 100.

The main body 40 includes a supporting member 41 and a cover 42 engaged with the supporting member 41. The supporting member 41 defines a cavity 411 for receiving the charging battery unit 100.

The receiving unit 10 is fixed on the battery 20; therefore, in Wireless Power Consortium authentication, it only needs to detect the charging battery unit 100, but not the whole electronic device 200.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A charging battery unit comprising:
   a receiving unit comprising a fixing member and a coil, the coil being fixed on the fixing member, the coil receiving an external electromagnetic signal to generate an induction current;
   a battery electrically connected to the coil and receiving the induction current generated by the coil, the receiving unit being attached to the battery by the fixing member; and
   a circuit board electrically connected with the coil and comprising a first part and a second part bended from a side of the first part;
   wherein the first part of the circuit board and the fixing member are arranged on a top surface of the battery side by side, and the second part of the circuit board is located at a lateral side of the battery.

2. The charging battery unit of claim 1, further comprising a detecting unit arranged on the first part of the circuit board for detecting the quantity of electricity of the battery.

3. The charging battery unit of claim 2, further comprising a display unit arranged on the first part of the circuit board for displaying the quantity of electricity of the battery detected by the detecting unit.

4. The charging battery unit of claim 3, wherein the display unit comprises two LEDs, and the LEDs emit light when the battery is fully charged.

5. An electronic device comprising:
   a main body; and
   a charging battery unit being received in the main body, the charging battery unit comprising a receiving unit, a circuit board, and a battery, the receiving unit comprising a fixing member and a coil, the coil being fixed on the fixing member, the coil receiving an external electromagnetic signal to generate an induction current, the battery electrically connected to the coil and receiving the induction current generated by the coil, the circuit board electrically connected with the coil and comprising a first part and a second part bended from a side of the first part, the receiving unit being attached to the battery by the fixing member; the first part of the circuit board and the fixing member are arranged on a top surface of the battery side by side, and the second part of the circuit board is located at a lateral side of the battery.

6. The electronic device of claim 5, further comprising a detecting unit arranged on the first part of the circuit board for detecting the quantity of electricity of the battery.

7. The electronic device of claim 6, further comprising a display unit arranged on the first part of the circuit board for displaying the quantity of electricity of the battery detected by the detecting unit.

8. The electronic device of claim 7, wherein the display unit comprises two LEDs, and the LEDs emit light when the battery is fully charged.

\* \* \* \* \*